(12) United States Patent
Kuznetsova et al.

(10) Patent No.: US 8,185,446 B1
(45) Date of Patent: May 22, 2012

(54) GENERATING PARTS BUNDLES

(75) Inventors: Olga I. Kuznetsova, Seattle, WA (US); Michael R. Brauwerman, Seattle, WA (US); Vivek A. Shah, Redmond, WA (US); Roy N. Harkness, Sammamish, WA (US); Alexander S. Borst, Seattle, WA (US); James C. Petts, Redmond, WA (US); Theodore H. Romer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/944,000

(22) Filed: Nov. 11, 2010

(51) Int. Cl.
*G06Q 30/00* (2006.01)
(52) U.S. Cl. ...................................... 705/26.1
(58) Field of Classification Search ................. 705/26.1
See application file for complete search history.

(56) References Cited

U.S. PATENT DOCUMENTS

| | | | |
|---|---|---|---|
| 2002/0032626 A1* | 3/2002 | DeWolf et al. | 705/35 |
| 2004/0068513 A1* | 4/2004 | Carroll et al. | 707/102 |
| 2009/0043629 A1* | 2/2009 | Price | 705/8 |
| 2009/0055244 A1* | 2/2009 | Reisz | 705/10 |

OTHER PUBLICATIONS

Laura Clark Geist; GM, dealers seek to boost service work; Automotive News. Detroit: Jul. 2, 2007. vol. 81, Iss. 6262; p. 20, 1 pgs; http://proquest.umi.com/pqdweb?did=1302453581&sid=1&Fmt=3&clientId=19649&RQT=309&VName=PQD.*

* cited by examiner

*Primary Examiner* — Mila Airapetian
(74) *Attorney, Agent, or Firm* — Thomas, Kayden, Horstemeyer & Risley, LLP

(57) ABSTRACT

Disclosed are various embodiments for generating automobile parts bundles associated with maintenance events. A maintenance schedule is retrieved and various maintenance events are identified. Various maintenance tasks associated with maintenance events are also identified. Parts associated with these maintenance tasks are placed into parts bundles associated with the maintenance event and a unique identifier within a parts catalog.

24 Claims, 9 Drawing Sheets

E-retailer.site

Select Vehicle:
- 2004
- BigCo
- Cruiser 5,000 Miles or 6 months
Select Bundle Type: OEM — 605

| Product | Quantity | Price |
|---|---|---|
| BigCo 10w40 | 6 | $18.99 |
| BigCo Oil Filter | 1 | $4.99 |

Total: $23.98    Add to Cart

E-retailer.site

Select Vehicle:
- 2004
- BigCo
- Cruiser 5,000 Miles or 6 months
Select Bundle Type: DIY - Premium
Include Tools in Bundle ☒

| Product | Quantity | Price | |
|---|---|---|---|
| Syn 10w40 | 6 | $35.99 | Premium |
| Super Oil Filter | 1 | $14.99 | Premium |
| Drain Plug | 1 | $2.00 | Aftermarket |
| 65mm Oil Filter Wrench | 1 | $8.99 | Budget |
| Drain Pan | 1 | $14.99 | DIY - Premium |
| Service Manual | 1 | 10.00 | |

Total: $86.96   (Add to Cart)

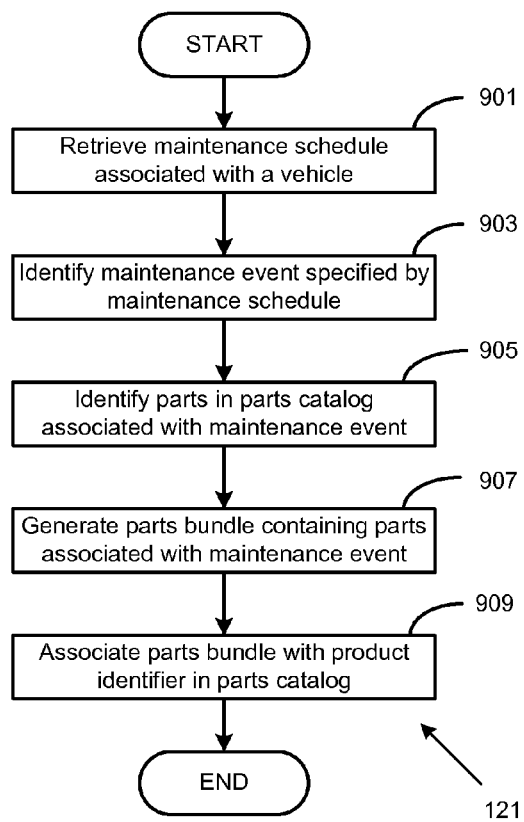
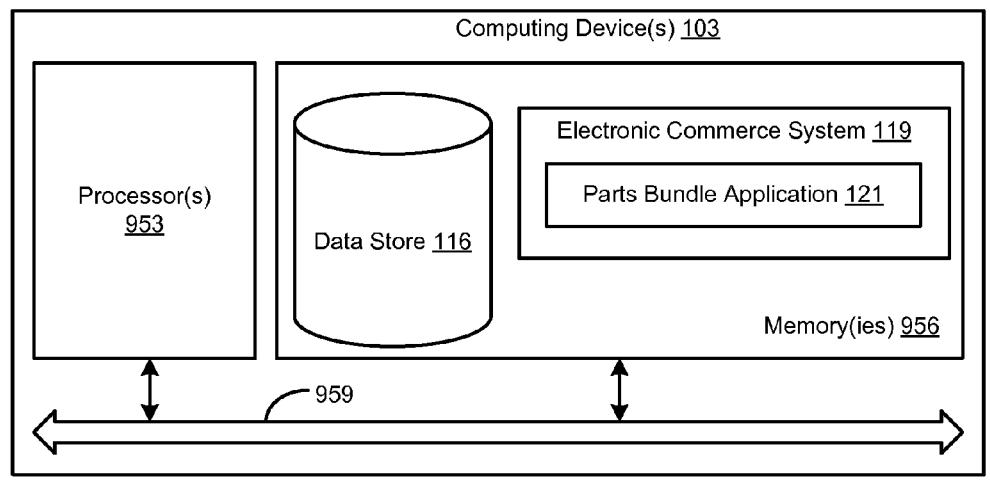

US 8,185,446 B1

GENERATING PARTS BUNDLES

BACKGROUND

In an electronic commerce system offering automobile parts for sale, customers may often face a difficulty in determining which parts to purchase for various maintenance events. Vehicles can be associated with various maintenance schedules and be compatible with various automobile parts, some of which are original equipment manufacturer parts and some of which are aftermarket parts. Additionally, while some retailers may specify parts that are compatible with a particular vehicle a user may still be unaware as to the various parts that may be necessary or suggested for a maintenance event recommended by a maintenance schedule or a specific project the user desires to have completed for his or her vehicle.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 6 is a drawing of an example of a user interface rendered by a client in the networked environment of FIG. 1 according to various embodiments of the present disclosure.

FIG. 8 is a drawing of an example of a user interface rendered by a client in the networked environment of FIG. 1 according to various embodiments of the present disclosure.

FIG. 9 is a flowchart illustrating one example of functionality implemented as portions of parts bundle application executed in a computing device in the networked environment of FIG. 1 according to various embodiments of the present disclosure.

FIG. 10 is a schematic block diagram that provides one example illustration of a computing device employed in the networked environment of FIG. 1 according to various embodiments of the present disclosure.

DETAILED DESCRIPTION

In the following discussion, a general description of the system and its components is provided, followed by a discussion of the operation of the same. Embodiments of the present disclosure are directed to systems and methods of generating parts bundles for users of an electronic commerce system seeking a grouping of automobile parts for a specific maintenance event related to a vehicle. As one example, a user may desire to purchase the parts necessary for completion of a maintenance event suggested by a manufacturer's maintenance schedule (e.g. a recommended vehicle servicing based on an age or mileage of the vehicle). Accordingly, embodiments of this disclosure can generate such a parts bundle and provide the bundle to the user. In some embodiments, such a parts bundle can be associated with a single product identifier so that a user may locate the parts bundle more easily rather than having to determine the various parts needed for a maintenance event and assemble a virtual a shopping cart containing the necessary parts.

Figure 1:
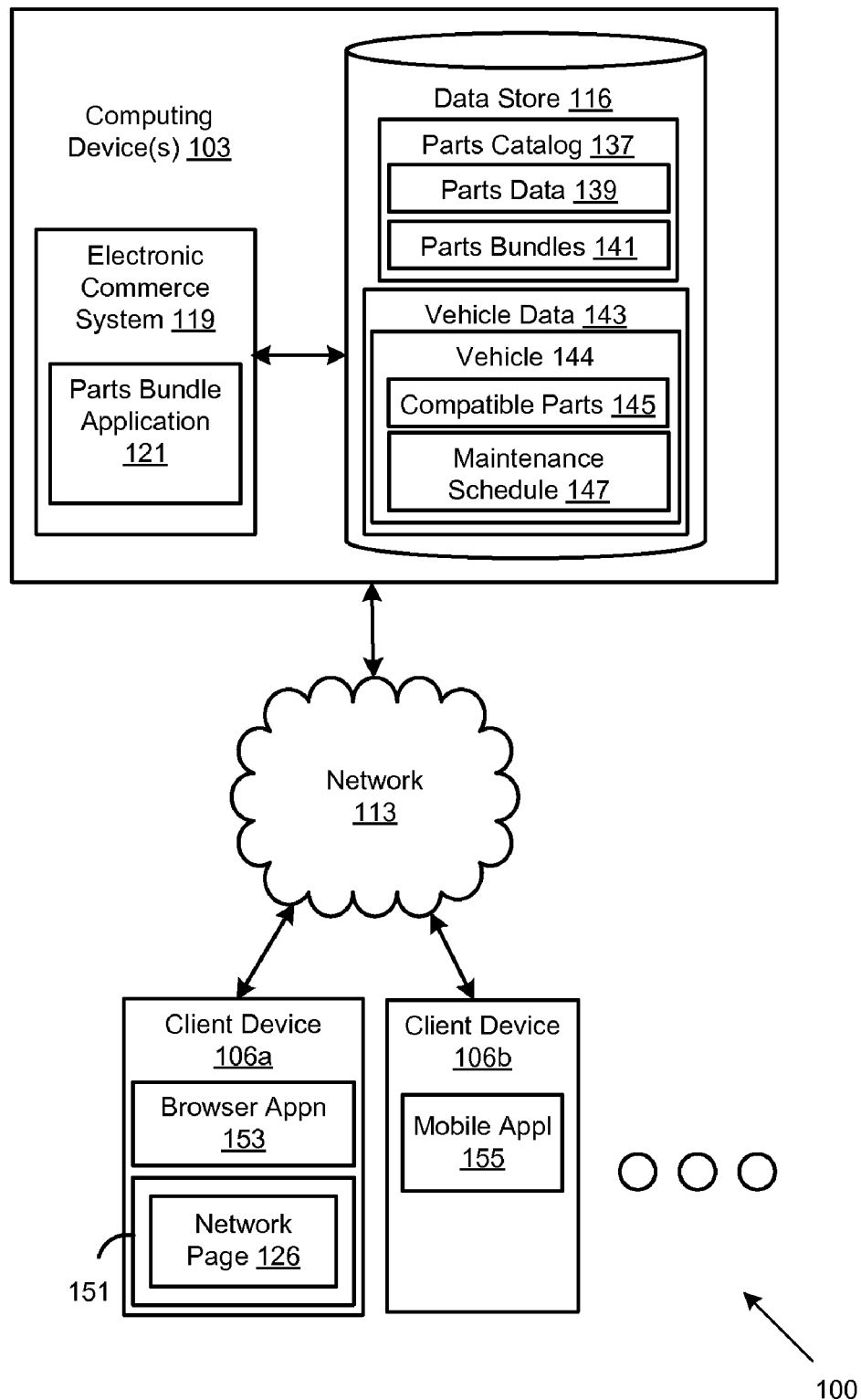
FIG. 1 is a drawing of networked environment according to various embodiments of the present disclosure.

With reference to FIG. 1, shown is a networked environment 100 according to various embodiments. The networked environment 100 includes at least one computing device 103 in communication with at least one client device 106a/106b. The network 113 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. As one example, each of the disclosed components executed in the computing device 103 can be executed in different computing devices 103 in various locations in one or more data centers. However, for purposes of convenience, the computing device 103 is referred to herein in the singular. Even though the computing device is referred to in the singular, it is understood that a plurality of computing devices 103 may be employed in the various arrangements as described above.

The components executed on the computing device 103 include, for example, an electronic commerce system 119, a parts bundle application 121, and other systems, applications, services, processes, engines, or functionality not discussed in detail herein. The electronic commerce system 119 is executed in order to facilitate the viewing and/or purchasing of items and products over the network 113. Accordingly, the electronic commerce system 119 can allow a seller to set pricing for the various items and products as well as process payments submitted or authorized by users to make purchases. The electronic commerce system 119 can direct the shipment and/or delivery of products to a customer from a fulfillment center or the like. In some embodiments, the electronic commerce system 119 can process an order and transmit order details to a seller for fulfillment of the order.

To this end, the electronic commerce system 119 can facilitate an electronic marketplace in which users can access products made available by sellers on various pricing, payment, and/or shipment terms. A user can browse various products available from various sellers via the electronic commerce system 119, and add products to a virtual shopping cart for later purchase. Various products in a virtual shopping cart can be fulfilled by various sellers and have various shipping terms and prices. The electronic commerce system 119 can access these various products from a product catalog that can be available in a data store or other system in communication with the electronic commerce system 119. The electronic commerce system 119 can, in one embodiment, process payment for items in a virtual shopping cart and forward payment to the various sellers associated with the items purchased by the user. The electronic commerce system 119 also performs various backend functions associated with the online presence of a merchant in order to facilitate the online purchase of items by users in such a marketplace.

For example, the electronic commerce system 119 generates network pages, such as web pages or other types of network content, that are provided to client devices 106a/106b in response to requests for the purposes of selecting items (e.g. automobile parts) for purchase and to perform other tasks as will be described. In other embodiments, the electronic commerce system 119 facilitates the generating of data for display on a user interface rendered by another type of application executed on a client device 106a/106b. Additionally, the electronic commerce system 119 can facilitate access by a user to a user account, which may contain profile data and other user specific data. The electronic commerce system 119 can facilitate the storage of shipping information, payment information, order history and other data with respect to the various user accounts. In the context of the present disclosure, a user profile can be associated with one or more vehicles specified by a user for which the user is shopping for automobile parts.

The parts bundle application 121 facilitates the creation of parts bundles that can be associated with various vehicles. A parts bundle, as is described in further detail herein, can include one or more automobile parts available via the electronic commerce system 119 that can be associated with various maintenance events or projects that are in turn associated with a particular vehicle. A parts bundle generated by the parts bundle application 121 can be associated with a single identifier with which a user can locate the bundle so that the bundle can be searchable and/or linkable. As one example, the parts bundle can be associated with a stock keeping unit, a universal product code, a globally unique identifier, or other identifier as can be appreciated. Accordingly, the parts bundle application 121 can identify parts bundles associated with a vehicle and/or maintenance event or project and make these bundles available to users via the electronic commerce system 119, which can streamline the purchase of automobile parts for owners of a particular vehicle seeking parts for a specific purpose, like a maintenance event.

With regard to the data store 116, the data stored therein can include, for example, a catalog that includes a listing of various products that are available for browsing and/or purchasing within the electronic commerce system 119. The data store 116 can include a catalog that can include various information about products available via the electronic commerce system 119. In particular, in the context of automobile parts available via the electronic commerce system 119, the data store 116 can include a parts catalog 137 that can include various data regarding automobile parts offered for sale by one or more sellers. The parts catalog 137 may include many fields of data regarding each item, such as, but not limited to, a product category, title, keywords, description, price, weight, shipping methods, related images, reviews, similar items, stock number, other associated categories, page view history, etc.

As one example, the parts catalog 137 can include parts data 139 for each automobile part available via the electronic commerce system 119. Parts data 139 can include product specifications, vehicle compatibility of an automobile part, manufacturer data, a stock keeping unit, serial number, and other data as can be appreciated. The parts data 139 can also specify a quality level associated with a particular automobile part. For example, the parts data 139 can specify that a particular type of engine oil available via the electronic commerce system 119 is a premium product, and that another type of engine oil is a standard and/or original equipment manufacturer level quality product. The parts catalog 137 can also include parts bundles 141. In one embodiment, a parts bundle 141 in the parts catalog 137 can include data regarding various automobile parts that are assembled into a bundle. The parts bundle 141 can include identifiers, stock keeping unit numbers, etc., associated with the various parts assembled to form a parts bundle 141. The parts bundle 141 in the parts catalog 137 can also include a unique identifier that the parts bundle application 121 can generate and assign to the parts bundle 121. The parts bundle 141 can also include data regarding one or more vehicles with which the bundle is associated. Additionally, the parts bundle 141 can include data regarding one or more maintenance events or projects with which the bundle is associated.

The data store 116 can also include a vehicle data 143 table, which can store various information regarding various vehicles for which automobile parts are available via the electronic commerce system 119. In one embodiment, the vehicle data 143 can include a vehicle 144 record for various vehicles, which can contain a compatible parts 145 data structure, in which information about parts that are compatible with a vehicle 144 and that are available via the electronic commerce system 119 is stored. In one embodiment, the compatible parts 145 can include a list of parts from the parts catalog 137, a compatibility matrix, or other data structure from which the parts bundle application 121 can determine whether a part in the parts catalog 137 is compatible with a particular vehicle 144. Compatible parts 145 can also specify aftermarket automobile parts that are compatible with the various original equipment manufacturer parts associated with a particular vehicle 144.

Vehicle data 143 can also include a maintenance schedule 147, which can describe a manufacturer's suggested maintenance schedule associated with a vehicle 144. As one example, the maintenance schedule 147 can include information about recommended servicing that a vehicle manufacturer recommends regarding a vehicle 144. In one embodiment, the maintenance schedule 147 can include a list of maintenance tasks that should be performed on a vehicle at various mileage and/or vehicle age intervals and the associated automobile parts necessary to complete the tasks. For example, the maintenance schedule 147 can specify that a particular vehicle 144 should have its engine oil and filter changed every five thousand miles. Additionally, the maintenance schedule 147 can specify the amount and type of engine oil and a type of oil filter that should be employed to carry out such a maintenance task.

As another example, the maintenance schedule 147 can specify that a timing belt of a vehicle should be replaced every one hundred thousand miles as well as specify the parts necessary to complete the task. In some embodiments, the maintenance schedule 147 can specify the original equipment manufacturer parts associated with a particular maintenance task, while compatible parts 145 can specify the compatible aftermarket parts that can be employed as substitutes, if any are available. The maintenance schedule 147 can also specify information about automobile parts associated with various maintenance or repair tasks that are not associated with a particular mileage interval or age of the vehicle. As one example, the maintenance schedule 147 can specify the automobile parts necessary to replace a vehicle battery (e.g., the battery model and/or type).

The data store 116 can also include other data that may be employed to facilitate an electronic commerce system 119, but such data is not discussed in detail herein. Additionally, it should be appreciated that the data store 116 can be implemented in a separate computing device that may be located in a separate installation or location. The depicted table and record structure of the data store 116 is one example of how data can be structured therein according to embodiments of this disclosure, as it should be appreciated that data can be structured in many different ways across multiple data stores implemented in various computing devices. As one example, data related to vehicles, automobile parts, compatible parts, maintenance schedules and/or tasks, etc., can be extracted by the parts bundle application 121 by performing queries against data stored in the data store 116 in wholly different table structures. Accordingly, it should be appreciated that the depicted data store 116 and the table structure shown therein is but one example given for ease of depiction and explanation of various embodiments of this disclosure.

Having described generally the various components depicted in the networked environment 100 of FIG. 1, the operation of various embodiments of the parts bundle application 121 will be described. As described above, the parts bundle application 121 can generate parts bundles that are associated with various maintenance tasks that are in turn associated with vehicles selected by a user of an electronic commerce system 121. To generate a parts bundle, the parts bundle application 121 can retrieve a maintenance schedule 147 associated with a vehicle 144 and extract at least one maintenance task specified by the maintenance schedule 147. As noted above, a maintenance schedule 147 associated with a vehicle 144 can specify various maintenance tasks recommended by a vehicle manufacturer to be performed on a vehicle at various mileage intervals or age of the vehicle. The maintenance schedule 147 may also specify parts necessary to complete these various tasks. Accordingly, in one embodiment, the parts bundle application 121 can examine various maintenance tasks that are specified by a maintenance schedule 147 associated with a vehicle 144 as well as the automobile parts necessary to perform the tasks and generate a parts bundle associated with a particular maintenance interval. For example, the parts bundle application 121 can generate a "five thousand mile" parts bundle associated a vehicle that includes the necessary parts associated with a manufacturer's recommended maintenance tasks to be performed when a vehicle reaches five thousand miles or a certain age.

Additionally, as noted above, a maintenance schedule 147 of a vehicle 144 can also specify other maintenance events and associated parts for various maintenance tasks that may not be associated with a particular mileage interval or age of a vehicle. For example, the maintenance schedule 147 associated with a vehicle 144 can specify the parts necessary to complete a brake disc replacement for the vehicle. Accordingly, the parts bundle application 121 can generate a parts bundle containing the parts necessary to complete the brake disc replacement and other maintenance events as can be appreciated.

While the maintenance schedule 147 may specify certain parts (e.g., original equipment parts) necessary to perform maintenance tasks associated with a maintenance event, the parts bundle application 121 can generate a parts bundle that contains compatible or equivalent parts. In this way, the parts bundle application 121 can generate parts bundles associated with maintenance events that contain parts of varying quality and/or price levels depending on the desires of the user. As a non-limiting example, the parts bundle application 121 can generate a premium parts bundle associated with a maintenance event that contains aftermarket parts of a higher quality than original equipment manufacturer parts associated specified by the maintenance schedule 127. Additionally, the parts bundle application 121 can generate a parts bundle containing the specified parts for a maintenance event (or compatible parts) as well as those that contain any tools or other supplies that can be used to complete the maintenance event. In this way, the parts bundle application 121 can generate one or more "do it yourself" parts bundles associated with a maintenance event so that a user may purchase the bundle and be assured that the bundle contains the necessary parts and tools required to complete the maintenance event.

Upon generating a parts bundle, the parts bundle application 121 can associate the bundle with a unique identifier in the parts catalog 137. The parts bundle application 121 can also generate various parts data 139 regarding the parts bundle that can be stored in the parts catalog 137. For example, the parts bundle application 121 can generate a parts bundle associated with a five thousand mile maintenance event for a vehicle and populate parts data 139 with a unique stock keeping unit, search terms, references to the vehicle and the maintenance event with which the bundle is associated, bundle pricing data, and a quality level. In this way, users of the electronic commerce system 119 can locate parts bundles associated with various vehicles that may be specified by a user browsing for automobile parts for their vehicle.

Figure 2:
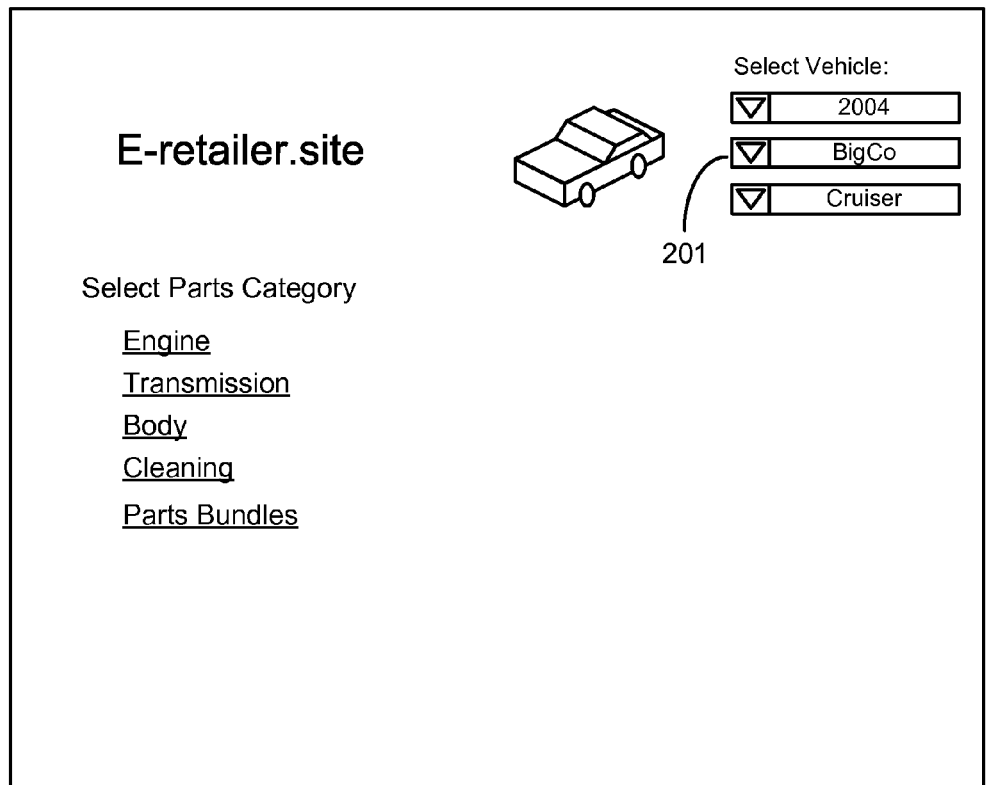
FIG. 2 is a drawing of an example of a user interface rendered by a client in the networked environment of FIG. 1 according to various embodiments of the present disclosure.

Having described the various ways in which a parts bundle can be generated by the parts bundle application 121, reference is now made to FIGS. 2-7, which depict various examples of parts bundles generated by the parts bundle application 121 that are accessed via the electronic commerce system 119. FIG. 2 depicts an example user interface 126a that can be generated by the electronic commerce system 119 to access parts bundles generated by the parts bundle application 121. Accordingly, a site implemented by the electronic commerce system 119 can allow a user to specify a vehicle for which the user wishes to shop for automobile parts. The user can select a vehicle using the hierarchical dropdown boxes 201 in the depicted user interface 126a. The electronic commerce system 119 can provide other user interface elements with which a user can select a vehicle. In one embodiment, a user may enter some or all of a vehicle identification number, which can be used to identify the vehicle type for which to display automobile parts and parts bundles.

Upon selection of a vehicle by the user, the electronic commerce system 119 can, in one embodiment, allow the user to browse various categories of automobile parts associated with the vehicle. In the depicted example, the user can view various parts categories shown by the illustrated hyperlinks, one of which can include parts bundles generated by the parts bundle application 121 that are associated with various maintenance events defined in a maintenance schedule 147 associated with the selected vehicle.

Figure 3:
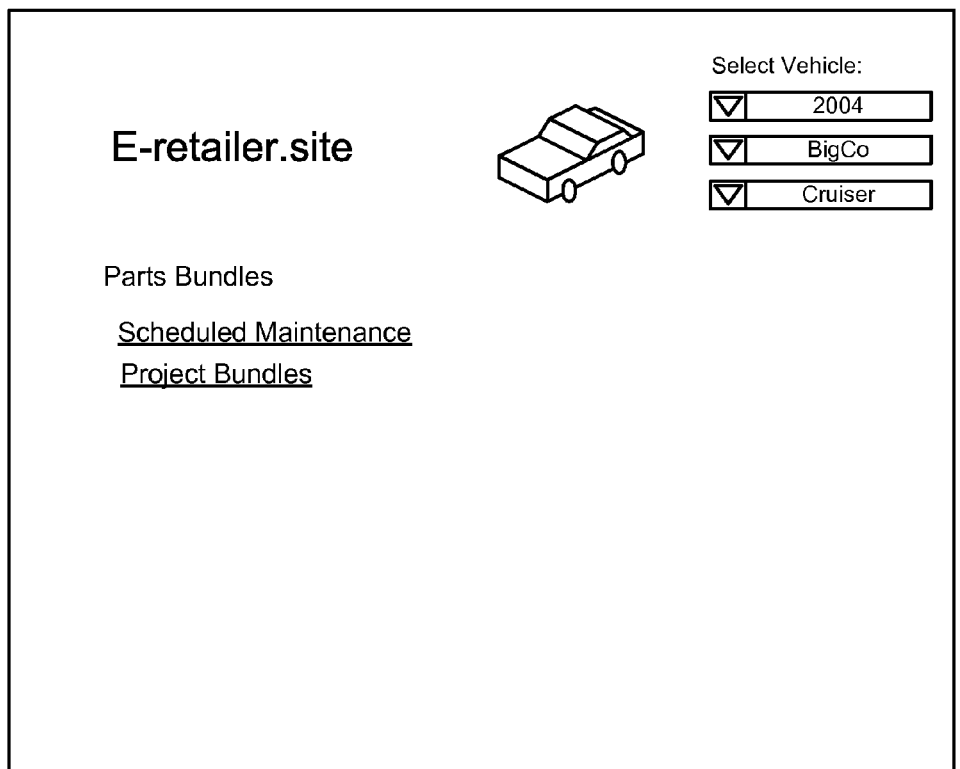
FIG. 3 is a drawing of an example of a user interface rendered by a client in the networked environment of FIG. 1 according to various embodiments of the present disclosure.

Accordingly, reference is now made to FIG. 3, which depicts various categories of parts bundles generated by the parts bundle application 121 and displayed in a user interface 126b by the electronic commerce system 119. As described above, the parts bundle application 121, when generating parts bundles associated with various vehicles from a parts catalog 127, the parts bundle application 121 can categorize the parts bundles in various ways. In the depicted example, the parts bundle application 121 has categorized the parts bundles in a scheduled maintenance category, which can include parts bundles that include the necessary parts to conduct a regular maintenance as specified by a maintenance schedule 147. Additionally, the parts bundle application 121 can generate project specific bundles, which can include parts necessary to perform various maintenance tasks associated with a selected vehicle, which will be further described with reference to FIG. 4.

Figure 4:
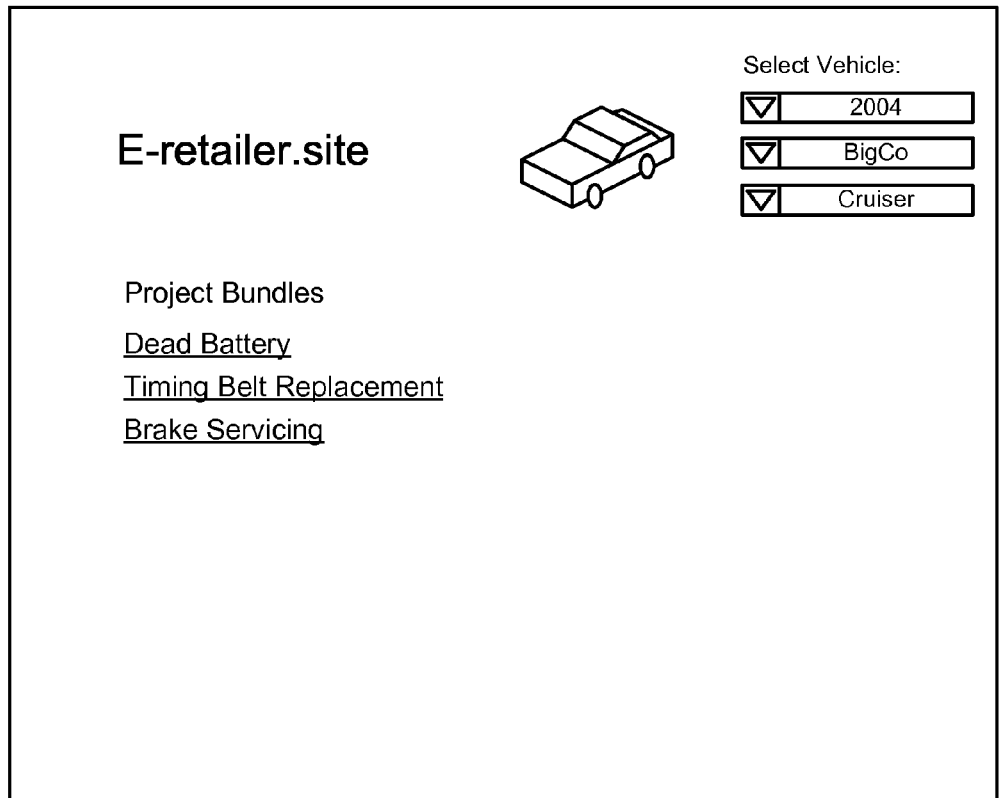
FIG. 4 is a drawing of an example of a user interface rendered by a client in the networked environment of FIG. 1 according to various embodiments of the present disclosure.

Reference is now made to FIG. 4, which depicts one example of parts bundles generated by the parts bundle application 121 that are associated with a vehicle selected by a user of the electronic commerce system 119 with the vehicle selector 201 (FIG. 2). The depicted parts bundles, as noted above, can be generated to include necessary parts to complete maintenance tasks that are commonly performed on the selected vehicle. Alternatively, the parts bundle application 121 can determine maintenance tasks that are commonly performed on other vehicles, and then generate an appropriate parts bundle for the selected vehicle. It should be appreciated that the depicted example project bundles are merely illustrative and do not constitute an exhaustive list of project specific parts bundles generated by the parts bundle application 121.

Figure 5:
FIG. 5 is a drawing of an example of a user interface rendered by a client in the networked environment of FIG. 1 according to various embodiments of the present disclosure.
Figure 7:
FIG. 7 is a drawing of an example of a user interface rendered by a client in the networked environment of FIG. 1 according to various embodiments of the present disclosure.

Reference is now made to FIG. 5, which depicts parts bundles that can be generated by the parts bundle application 121 that are directed to maintenance tasks defined by a maintenance schedule 147 to be performed periodically and/or regularly on the selected vehicle. In one embodiment, the parts bundle application 121 can extract the various maintenance windows associated with a vehicle from a maintenance schedule 147 as well as the parts specified by the maintenance schedule 147 that are necessary to perform maintenance tasks associated with a maintenance window. In the depicted example, the maintenance schedule 147 associated with the depicted vehicle specifies various maintenance windows during which it is recommended that various maintenance tasks be performed. Accordingly, the parts bundle application 121 can extract the necessary parts from the parts catalog 137 and generate parts bundles appropriate for these maintenance windows so that a user can purchase a parts bundle and receive all of the necessary parts to have the maintenance tasks performed. The parts bundle application 121 can either generate these parts bundles and allow a user to select the appropriate bundle depending on the mileage and/or age of the vehicle, or the parts bundle application 121 can receive user input from a user input element 503 in the user interface 126d that allows the user to specify a mileage or age associated with a vehicle, and the parts bundle application 121 and/or electronic commerce system 119 can recommend a parts bundle for the user.

In some embodiments, the parts bundle application 121 can track a maintenance history associated with a vehicle of the user and recommend parts bundles based on a mileage, age and/or maintenance history of a particular vehicle. Additionally, the parts bundle application 121 can track a historical mileage associated with a vehicle of the user, and make recommendations regarding parts bundles that a user may require in advance of a particular maintenance event associated with the vehicle. As one example, if a user previously entered a mileage or age associated with a vehicle, the parts bundle application can make a recommendation for a parts bundle associated with a subsequent maintenance event based on an estimated mileage accumulation associated with the vehicle.

Reference is now made to FIG. 6, which depicts a parts bundle associated with a maintenance event that is in turn associated with a user selected vehicle. In the depicted example user interface 126e, a user may also select a bundle type by manipulating the bundle selector user interface element 605, which can allow the user to choose from various types of parts bundles generated by the parts bundle application 121 that the parts bundle application 121 has associated with a particular maintenance event.

In one embodiment, the parts bundle application 121 can generate a parts bundle containing original equipment manufacturer parts for a particular maintenance event. In some embodiments, the parts bundle application 121 can also generate a bundle containing compatible parts for the maintenance event that are not original equipment manufacturer parts. Accordingly, as shown in the user interface 126f of FIG. 7, the electronic commerce system 119 can provide a premium parts bundle containing premium parts that can be used to complete a maintenance event specified by the maintenance schedule 147 associated with the for the maintenance event.

Reference is now made to FIG. 8, which depicts a parts bundle user interface 126g displaying an alternative parts bundle generated by the parts bundle application 121 that contains additional items that can be used to complete a maintenance event specified by a maintenance schedule 147. The depicted parts bundle includes various tools or other supplies that are associated with the maintenance event and that can facilitate do it yourself completion of the maintenance event identified by the parts bundle application 121 in the maintenance schedule 147.

Additionally, FIG. 8 illustrates additional configurability of a parts bundle generating by the parts bundle application 121. The depicted parts bundle user interface 126g can allow a user to customize the parts bundle generated by the parts bundle application by removing automobile parts in the parts bundle. Additionally, the parts bundler user interface 126g allows a user to select a product type associated with the various parts in the bundle. In the depicted example, a user can select varying quality levels or other product characteristics associated with each of the parts in the bundle. Accordingly, the parts bundle application 121 can determine compatible parts associated with each of the parts in the parts bundle, and allow the user to toggle selections for each item in the bundle.

Referring next to FIG. 9, shown is a flowchart that provides one example of the operation of a portion of the parts bundle application 121 according to various embodiments. It is understood that the flowchart of FIG. 9 provides merely an example of the many different types of functional arrangements that may be employed to implement the operation of the portion of the parts bundle application 121 as described herein. As an alternative, the flowchart of FIG. 9 may be viewed as depicting an example of steps of a method implemented in the computing device 103 (FIG. 1) according to one or more embodiments.

Beginning with box 901, the parts bundle application 121 retrieves a maintenance schedule associated with a vehicle. The parts bundle application 121, in box 903, identifies at least one maintenance event associated with the vehicle that is specified by the maintenance schedule. In box 905, the parts bundle application 121 identifies parts associated with the maintenance event in a parts catalog. The parts can be specified by the maintenance schedule or they can include parts that are compatible with the specified parts. In box 907, the parts bundle application 121 generates a parts bundle associated with the maintenance event that can include the parts necessary to complete the maintenance event. As described above, the parts bundle application 121 can generate various types of parts bundles that can be made available via an electronic commerce system 119 (FIG. 1). In box 909, the parts bundle application 121 can associate the generated parts bundle with an identifier in a parts catalog accessible by the electronic commerce system 119 so that a user of the electronic commerce system can locate and/or purchase the parts bundle.

With reference to FIG. 10, shown is a schematic block diagram of the computing device 103 according to an embodiment of the present disclosure. The computing device 103 includes at least one processor circuit, for example, having a processor 953 and a memory 956, both of which are coupled to a local interface 959. To this end, the computing device 103 may comprise, for example, at least one server computer or like device. The local interface 959 may comprise, for example, a data bus with an accompanying address/control bus or other bus structure as can be appreciated.

Stored in the memory 956 are both data and several components that are executable by the processor 953. In particular, stored in the memory 956 and executable by the processor 953 are the electronic commerce system 119, parts bundle application 121, and potentially other applications. Also stored in the memory 956 may be a data store 116 and other data. In addition, an operating system may be stored in the memory 956 and executable by the processor 953.

It is understood that there may be other applications that are stored in the memory 956 and are executable by the processors 953 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 956 and are executable by the processor 953. In this respect, the term "executable" means a program file that is in a form that can ultimately be run by the processor 953. Examples of executable programs may be, for example, a compiled program that can be translated into machine code in a format that can be loaded into a random access portion of the memory 956 and run by the processor 953, source code that may be expressed in proper format such as object code that is capable of being loaded into a random access portion of the memory 956 and executed by the processor 953, or source code that may be interpreted by another executable program to generate instructions in a random access portion of the memory 956 to be executed by the processor 953, etc. An executable program may be stored in any portion or component of the memory 956 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 956 is defined herein as including both volatile and nonvolatile memory and data storage components. Volatile components are those that do not retain data values upon loss of power. Nonvolatile components are those that retain data upon a loss of power. Thus, the memory 956 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 953 may represent multiple processors 953 and the memory 956 may represent multiple memories 956 that operate in parallel processing circuits, respectively. In such a case, the local interface 959 may be an appropriate network 113 (FIG. 1) that facilitates communication between any two of the multiple processors 953, between any processor 953 and any of the memories 956, or between any two of the memories 956, etc. The local interface 959 may comprise additional systems designed to coordinate this communication, including, for example, performing load balancing. The processor 953 may be of electrical or of some other available construction.

Although the electronic commerce system 119, parts bundle application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 9 shows the functionality and operation of an implementation of portions of the parts bundle application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 953 in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including in the electronic commerce system 119 and/or the parts bundle application 121, that comprises software or code can be embodied in any non-transitory computer-readable medium for use by or in connection with an instruction execution system such as, for example, a processor 953 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
   code that retrieves, in at least one computing device executing an electronic commerce system configured to provide a plurality of automobile parts for sale, at least one automobile maintenance schedule associated with a respective at least one automobile;
   code that identifies, in the at least one computing device, a maintenance event in the at least one automobile maintenance schedule, the maintenance event further comprises a plurality of maintenance tasks performed on an automobile when the automobile reaches a certain mileage;
   code that identifies, in the at least one computing device, a plurality of compatible automobile parts being compatible with the automobile; and
   code that generates, in the at least one computing device, a plurality of product bundles comprising the at least one compatible automobile part associated with a product identifier in the product catalog and generated by identifying at least one compatible automobile part that can be used to complete the maintenance event.

2. The non-transitory computer-readable medium of claim 1, wherein the code that generates a plurality of product bundles further comprises:
   code that generates an original equipment part product bundle, the original equipment part product bundle comprising at least one original equipment part associated with the suggested maintenance event; and
   code that generates an alternative product bundle, the alternative product bundle comprising at least one aftermarket automobile part associated with the suggested maintenance event.

3. The non-transitory computer-readable medium of claim 1, wherein the code that generates a plurality of product bundles further comprises:
   code that generates a premium product bundle, the premium product bundle comprising at least one premium part associated with the suggested maintenance event; and
   code that generates a low cost product bundle, the low cost product bundle comprising at least one low cost automobile part associated with a price that is less than the at least one premium part and that is associated with the suggested maintenance event.

4. A method, comprising the steps of:
   retrieving, in at least one computing device executing an electronic commerce system configured to provide a plurality of automobile parts for sale, a plurality of compatible automobile parts associated with at least one automobile;
   identifying, in the at least one computing device, a maintenance event associated with the at least one automobile;
   identifying at least one automobile part that can be used to complete the maintenance event;
   generating, in the at least one computing device, a product bundle comprising the at least one automobile part, the product bundle associated with a product identifier in a product catalog; and
   generating, in the at least one computing device, a product bundle user interface, the product bundle user interface facilitating customization of at least one product associated with the at least one automobile part in the product bundle.

5. The method of claim 4, further comprising the step of identifying at least one alternative automobile part interchangeable with the at least one automobile part in the product bundle, and the product bundle user interface facilitates selection of the at least one alternative automobile part.

6. The method of claim 4, wherein the maintenance event further comprises a plurality of maintenance tasks performed on an automobile.

7. The method of claim 4, wherein the maintenance event further comprises a plurality of maintenance tasks performed on an automobile at an age of the automobile.

8. The method of claim 7, wherein the age of the automobile is expressed in terms of a distance traveled, the distance traveled shown on an odometer associated with the automobile.

9. The method of claim 5, wherein the step of identifying at least one alternative automobile part interchangeable with the at least one automobile part further comprises the step of identifying, in the at least one computing device, at least one original equipment manufacturer part associated with the recommended maintenance event.

10. The method of claim 9, wherein the step of identifying at least one alternative automobile part interchangeable with the at least one automobile part further comprises the step of identifying, in the at least one computing device, at least one automobile part associated with a different quality level relative to the at least one original equipment manufacturer part.

11. The method of claim 5, wherein the step of identifying at least one alternative automobile part interchangeable with the at least one automobile part further comprises the step of identifying, in the at least one computing device, at least one aftermarket part associated with the recommended maintenance event.

12. The method of claim 4, wherein the product bundle user interface further comprises a product customization user interface element, the product customization user interface element facilitating selection of a product type associated with the at least one automobile part, the product type being at least one of: an aftermarket part, an original equipment manufacturer part, a high quality part, and a low cost part.

13. The method of claim 4, further comprising the steps of:
   determining whether the maintenance event is a recurring maintenance event; and
   transmitting an offer to sell the product bundle on a recurring basis.

14. The method of claim 4, further comprising the steps of:
   identifying, in the at least one computing device, at least one tool required to complete at least one task associated with the maintenance event; and
   adding the at least one tool to the product bundle.

15. The method of claim 4, further comprising the steps of:
   identifying, in the at least one computing device, at least one reference manual associated with the at least one automobile; and
   adding the at least one reference manual to the product bundle.

16. A system, comprising:
   at least one computing device; and
   a parts bundle application executable in the at least one computing device, the parts bundle application comprising:
   logic that retrieves, in at least one computing device executing an electronic commerce system configured to provide a plurality of automobile parts for sale, the automobile parts associated with a product catalog, at least one automobile maintenance schedule, the at least one maintenance schedule associated with a respective at least one automobile;
   logic that identifies, in the at least one computing device, a maintenance event in the at least one automobile maintenance schedule;
   logic that generates, in the at least one computing device, a product bundle comprising the at least one automobile part, the product bundle associated with a product identifier in the product catalog and generated by identifying, in the product catalog, at least one automobile part that can be used to complete the maintenance event; and
   logic that identifies an alternative product bundle, the alternative product bundle comprising at least one aftermarket automobile part associated with the suggested maintenance event.

17. The system of claim 16, wherein the maintenance event further comprises a plurality of maintenance tasks performed on an automobile.

18. The method of claim 16, wherein the maintenance event further comprises a plurality of maintenance tasks performed on an automobile at an age of the automobile.

19. The system of claim 18, wherein the age of the automobile is expressed in terms of a distance traveled, the distance traveled shown on an odometer associated with the automobile.

20. The system of claim 16, wherein the logic that generates a product bundle comprising the at least one automobile part further comprises logic that identifies at least one original equipment manufacturer part associated with the recommended maintenance event.

21. The system of claim 20, wherein the parts bundle application further comprises logic that identifies a plurality of product bundles comprising at least one automobile part, the plurality of product bundles associated with a plurality of quality levels.

22. The system of claim 16, wherein the alternative product bundle is associated with a lower cost relative to the product bundle.

23. The system of claim 16, wherein the parts bundle application further comprises:
   logic that determines whether the maintenance event is a recurring maintenance event; and
   logic that transmits an offer to sell the product bundle on a recurring basis.

24. The system of claim 16, wherein the parts bundle application further comprises:
   logic that identifies at least one tool required to complete at least one task associated with the maintenance event; and
   logic that adds the at least one tool to the product bundle.

* * * * *